(12) United States Patent
Babb

(10) Patent No.: US 6,393,700 B1
(45) Date of Patent: May 28, 2002

(54) TUBE CUTTER

(75) Inventor: Larry F. Babb, Grafton, OH (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/639,632

(22) Filed: Aug. 15, 2000

(51) Int. Cl.$^7$ .................. B26D 3/16; B23D 21/08
(52) U.S. Cl. ........................... 30/102; 30/101
(58) Field of Search .................. 30/91.2, 93, 94, 30/95, 96, 101, 102

(56) References Cited

U.S. PATENT DOCUMENTS

| | | | |
|---|---|---|---|
| 1,945,949 A | | 2/1934 | Myers |
| 2,283,572 A | * | 5/1942 | Petersen ................. 30/102 |
| 2,448,578 A | | 9/1948 | Condon |
| 3,376,638 A | * | 4/1968 | Bjalme et al. ............ 30/102 |
| 4,831,732 A | * | 5/1989 | Garton ................... 30/102 |
| 5,206,996 A | | 5/1993 | McDaniel |
| 5,315,759 A | * | 5/1994 | Mashata ................. 30/102 |
| 5,345,682 A | | 9/1994 | Dubinsky et al. |
| 5,495,672 A | | 3/1996 | Kritchever et al. |
| 5,903,980 A | | 5/1999 | Collier et al. |

* cited by examiner

Primary Examiner—Hwei-Siu Payer
(74) Attorney, Agent, or Firm—Vickers, Daniels & Young

(57) ABSTRACT

A tube cutter for cutting a circular tube having a central tube axis, the cutter comprising: a housing with first and second parallel rollers defining a cradle for receiving a tube cut with the tube axis generally parallel to the axes of the rollers, a cutter head reciprocally mounted on the housing for sliding linearly in a direction toward and away from the rollers, the cutter head having a base and an upstanding arm supporting a cutter wheel rotatable about an axis generally parallel to the axes of the rollers and facing the tube in the cradle, a spring element biasing the cutter wheel in the stated direction and toward the rollers, and a threaded shaft between the housing and cutter head, and rotatable to move the cutter head linearly toward the housing, whereby the cutter wheel engages the tube and the spring element creates a cutting force pushing the cutter wheel against the tube for cutting the tube.

30 Claims, 3 Drawing Sheets

TUBE CUTTER

The present invention relates to the field of tube cutting and more particularly to a tube cutter having an automatic feed as the cutter is rotated for the purpose of cutting through the tube.

BACKGROUND OF THE INVENTION

A large number of devices exist for rotating a cutter around a tube to cut the tube at the desired position. The present invention relates to a tube cutter wherein the cutter wheel is a wheel biased against the outer surface of the tube to automatically advance or feed the cutter into the tube as the cutter is rotated. A common arrangement for accomplishing this objective is shown in Condon U.S. Pat. No. 2,448,578 and Collier U.S. Pat. No. 5,903,980. A cutter or cutters are carried on a clam shell type frame by a spring element so the clam shell can be assembled over a tube with the cutter biased against the outside surface of the tube. By rotating the frame, the cutter or cutters automatically advances into the tube until the tube is severed. Such devices do not specifically relate to the present invention, but are incorporated by reference herein as background information. Another mechanism for tube cutters having an automatically advanced cutter is illustrated in McDaniel U.S. Pat. No. 5,206,996. A cutter wheel is mounted on a spring biased lever system or is spring biased from one side of a fixed C-shaped frame. This patent is incorporated by reference herein as further background information, even though it does not even disclose the general feeding arrangement used in the present invention.

The invention involves a tube cutter wherein a housing, frame, or jaw supports and forms a cradle for the tube to be cut. An opposite frame, jaw, or arm carries the rotary cutter wheel and slides toward the tube being cut during the cutting operation. The sliding jaw concept for tube cutters is illustrated in Myers U.S. Pat. No. 1,945,949 and Kritchever U.S. Pat. No. 5,495,672 both of which are incorporated by reference herein as teaching the general concept to which the present invention is directed. This general concept is an automatic tube cutter wherein the cutter includes two linearly slidable frames movable together to define the cutting action. The rotary cutting wheel is biased against the tube so that it is automatically advanced as the cutting depth increases during the rotary cutting action.

BACKGROUND OF INVENTION

Tube cutters are well known in the field and are generally constructed to allow movement of the cutting wheel into the tube by manually advancing the cutting wheel inwardly during the cutting operation. Such devices are awkward to use and require constant operator attention, as well as skill. Consequently, it has become somewhat common to provide a tube cutter in which the rotating cutting wheel is automatically fed into the tube as it is being cut. This provides a tube cutter that is easily and quickly positioned for use. Such tube cutter only requires turning of the cutter around the tube in order to complete the cutting operation once the cutter has been positioned on the tube. This rotating action can be manual or can be by a power drive as shown in Kritchever U.S. Pat. No. 5,495,672. The difficulty is that the various structures for accomplishing the automatic feeding of cutting wheel into the tube during the rotating cutting action have advantages, but present distinct disadvantages. For instance, when the automatic advancing cutter is in a clam shell frame, as shown in Condon U.S. Pat. No. 2,448,578 or Collier U.S. Pat. No. 5,903,980, the size of the frame is dictated by the size of the tube being cut. Consequently, each tube size requires its own cutter. The amount of spring force exerted during the cutting operation is dictated by the size of the clam shell frame. Minor differences in the diameter of the tube can not be accommodated in such fixed frame rotary tube cutters. These cutters are thus dedicated tools and can not be used universally. Another type of tube cutter that is generally size specific is shown in McDaniel U.S. Pat. No. 5,206,996. The diameter of the tube being cut dictates the size of the U-shaped frame for carrying the support rollers and the spring biased cutter. With this fixed frame tube cutter, there is no easy way to accommodate different tube sizes. As the spring loses its spring force during long-term use or in temperature changes, the cutting action is drastically affected. This is also true of the encircling frame type of tool. Each of these cutters is tube size specific and susceptible to changes in the spring biased cutter to alter the efficiency and effectiveness of the cutting action. McDaniel recognizes the disadvantage of fixed frame tube cutter by suggesting a tube cutter involving a spring biased lever system wherein one blade of the system carries the support rolls and the other blade carries the rotating cutter wheel. This attempt to rectify the problems associated with a fixed frame tube cutter is not successful for many reasons. It includes protruding handles and a pivoting infeed of the rotating cutter wheel that changes the cutting action and spring force according to the diameter of the tube being cut.

The disadvantages of tube cutters that automatically feed the cutter wheel into the tube during cutting, but are size specific, was generally solved in 1934. In Myers U.S. Pat. No. 1,945,949, a first frame carries the two tube support rollers. The other frame rotates the rotating cutter wheel about a fixed axis and is pulled toward the first frame by a threaded shaft. To load the cutter for automatic feeding, the shaft is connected between the two frames through a coil spring. Movement of the second frame stops when the cutter wheel engages the surface of the tube positioned adjacent the support rollers in the first frame. Thereafter, rotation of the threaded shaft compresses the coil spring to bias the second frame toward the first frame. During the cutting action, as the tool is rotated about the tube, the second frame advances toward the first frame as the depth of cut increases. This action creates automatic feeding for the rotating cutter blade. The tool is not size specific. Sliding of one frame with respect to the other frame with the spring loaded threaded shaft has heretofore proved an extreme benefit over the fixed frame tube cutters described above. Another version of the cutter shown in Myers is illustrated in Kritchever U.S. Pat. No. 5,495,672. The movable jaw or frame carrying the rotating wheel is moved toward the tube cradled by the support rollers on the other frame. The rotating threaded shaft moves the one jaw until it engages and clamps the tube in the cutter. Additional rotation of the threaded shaft compresses an encircling spring to determine the amount of force exerted by the cutter wheel against the tube. After the force has been applied one jaw is biased toward the other jaw to load the rotating cutter wheel for automatic feeding as the cut progresses. This type of cutter can be operated manually or by a power rotating device. Even though there is an advantage for the movable frame type pipe cutters they still have certain disadvantages. The cutting action is controlled by a Belleville spring or a coil spring surrounding the shaft used for sliding one jaw toward the other jaw. Such spring indirectly affects the moving action of the cutter wheel. The wheel movement is also affected by sliding of the two frames together. Dirt and environmental contamination can adversely affect the cutting action. Indeed, in some instances, dirt and contamination in the slide mechanism between the two frames renders this type of cutter inoperative. Since the jaw must be moved by an intermediate spring, it is difficult for the threaded shaft to overcome irregularities in the sliding mechanism. The second frame may be movable into the cutting position, but during the cutting action, it can jerk, freeze or otherwise affect the smoothness and repeatability of the tube cutting operation. Friction irregularities causes jerks, which can affect the uniformity of the cut being made on the tube. All of these disadvantages have resulted in certain operators preferring the fixed frame concept shown in Collier U.S. Pat. No. 5,903,980. Consequently, tube cutters with automatic feeding are either size specific or susceptible to less than optimum cutting action, or both.

SUMMARY OF INVENTION

The present invention relates to a tube cutter of the type which automatically feeds the cutter wheel into the tube as the cutting operation progresses, without the disadvantage of size specific fixed frame tools or tools that have a metal to metal sliding action during the cutting operation. The automatic feed for the rotating tube cutter is smooth, gradual and continuous without the constraints of a fixed frame tool.

In accordance with the present invention, there is provided a tube cutter for cutting a circular tube having a central axis. This cutter includes a housing with first and second parallel rollers defining a cradle for receiving a tube to be cut, with the two axis generally parallel to the axes of the rollers. The housing forms a first frame. The second frame is a cutter head reciprocally mounted on the housing for sliding linearly in a direction toward and away from the rollers. This second frame, or cutter head, includes an upstanding arm supporting a cutter wheel rotatable about an axis generally parallel to the axes of the rollers and facing the tube as it is received in the cradle defined by the rollers. As so far described, the invention is similar to prior adjustable frame tube cutters. One frame slides linearly with respect to the other frame to accommodate different tube sizes. In accordance with the invention, a spring element is used to mount the cutter wheel onto the head or second frame, thus biasing the cutter wheel in the direction of movement of the second frame as it moves toward the support rollers. A threaded shaft between the housing, or first frame, and the cutter head, or second frame, is rotatable to move the cutter head linearly toward and away from the housing. The threaded shaft does not have an intermediate connection by way of an encircling spring, such as a coil spring or Belleville spring. There is positive movement of one frame on the other frame in a linear sliding action. This movement is under the direct control of the thread and is not affected adversely by contamination, dirt or other obstructions which must be overcome by the manual rotation of the threaded shaft. The invention allows the second frame to be moved toward the first frame until the cutter wheel engages the tube. Then, the spring element is deflected to create a cutting force pushing the wheel against the tube for the cutting action. In the preferred embodiment of the invention, the cutter wheel is carried by a shaft that is movably mounted with respect to the second frame, or upstanding arm, so that the spring element can be a spring between the cutter support shaft and the inwardly moving arm or frame. The force biasing the cutter wheel toward the tube is dictated by only the spring constant of the intermediate spring supporting the rotating cutter wheel. There is no sliding action needed to cut the tube. A secondary application of the present invention is the provision of a cutter wheel rotatably mounted on the upstanding arm of the second frame. To accomplish the springing action, the arm has a flexible section between the cutter and the remainder of the second frame. In this alternative embodiment of the invention, the second frame is moved toward the first frame to capture the tube. Rotation of the threaded shaft further deflects the resilient flexible portion of the arm to apply a biasing force or load on the wheel for automatic feeding during the cutting operation. This second embodiment is not the preferred embodiment, but is an alternative tool using the invention.

The primary object of the present invention is the provision of a tube cutter using an automatic feed feature, which cutter is not size specific.

Another object of the present invention is the provision of a tube cutter, as defined above, which tube cutter has a smooth uniform cutting action that is not affected by contamination, dirt and/or obstructions capable of affecting a smooth sliding action between two metal frames.

Yet another object of the present invention is the provision of a tube cutter, as defined above, which tube cutter overcomes the disadvantage of a fixed frame tube cutter and the disadvantages of an adjustable frame tube cutter, while maintaining the capability of automatically feeding the rotating cutter wheel into the tube during the cutting.

Still a further object of the present invention is the provision of a tube cutter, as defined above, which tube cutter utilizes a unique and novel spring for biasing the cutting wheel toward the tube.

Another object of the present invention is the provision of a tube cutter, as defined above, which tube cutter utilizes a movable frame concept where the frames are in a fixed position during the cutting operation.

These and other objects and advantages will become apparent from the following description taken together with the accompanying drawings.

PREFERRED EMBODIMENT

Figure 1:
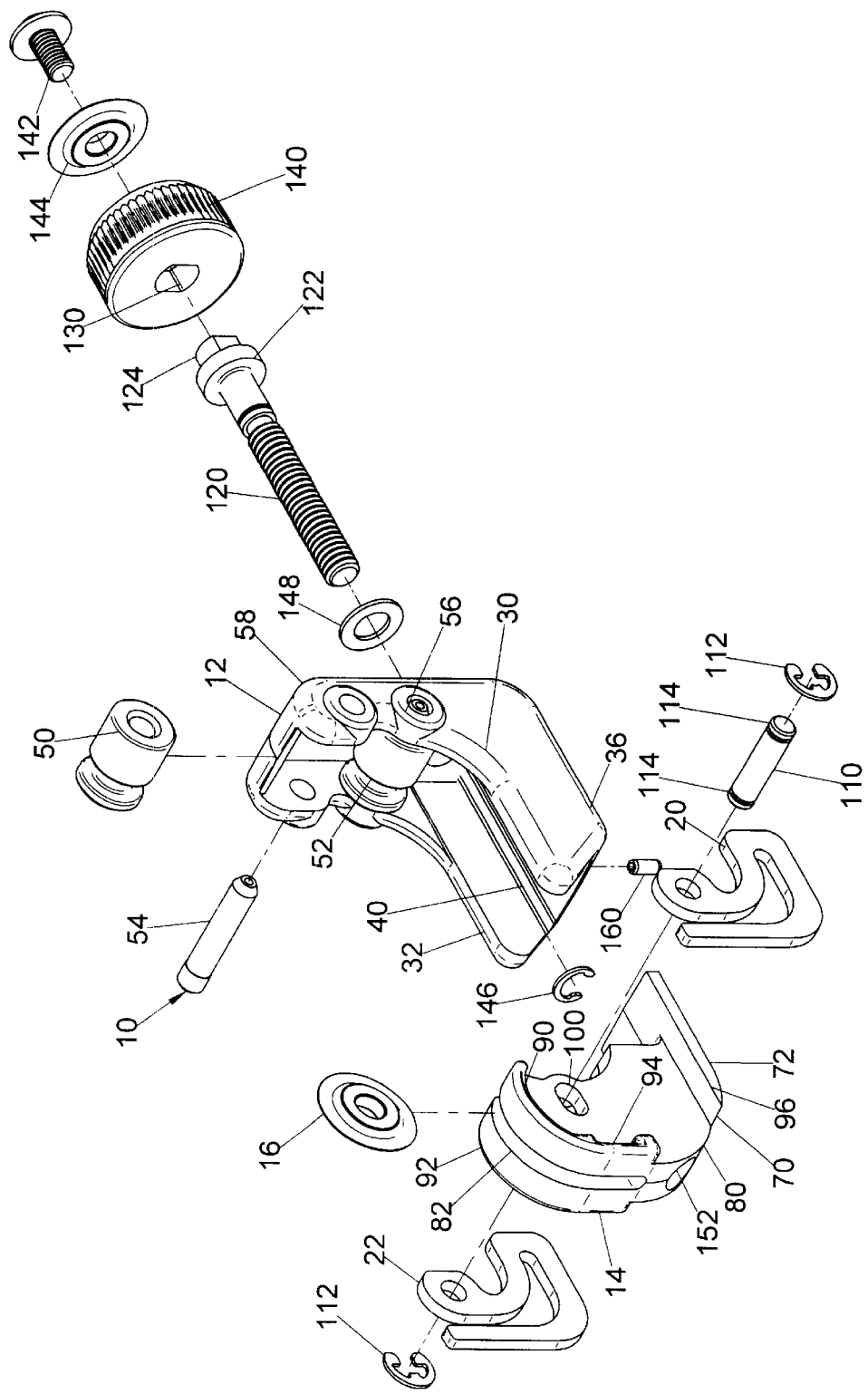
FIG. 1 is a pictorial view of the preferred embodiment of the present invention.
Figure 2:
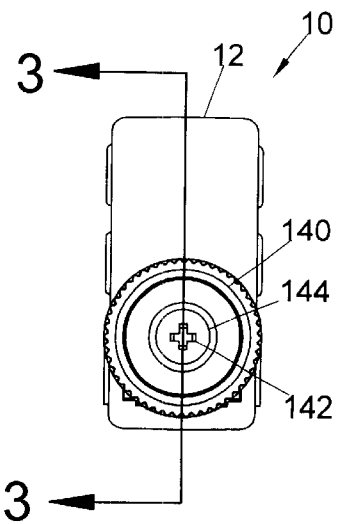
FIG. 2 is an end view of the preferred embodiment of the present invention.
Figure 3:
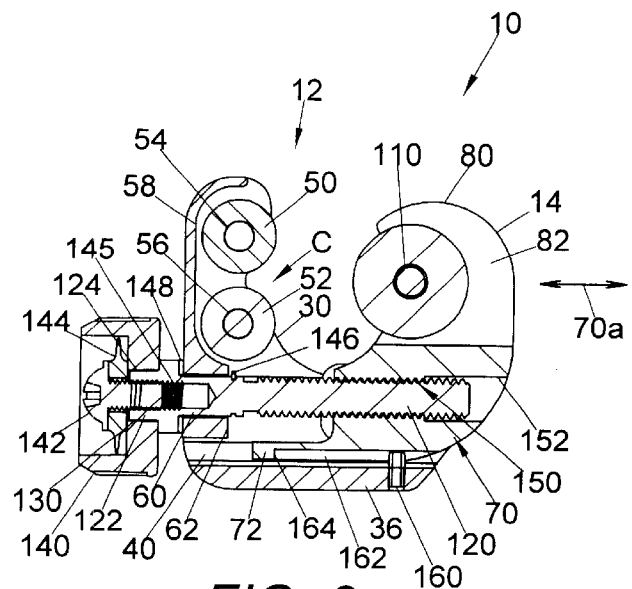
FIG. 3 is a cross sectional side view taken generally along line 3—3 of FIG. 2.
Figure 4:
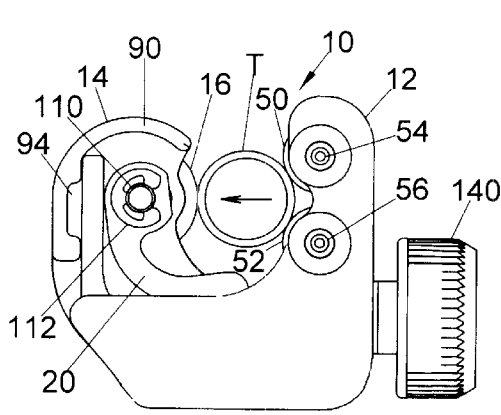
FIG. 4 is side view of a cutter constructed in accordance with the preferred embodiment of the invention at the start of a cut.
Figure 5:
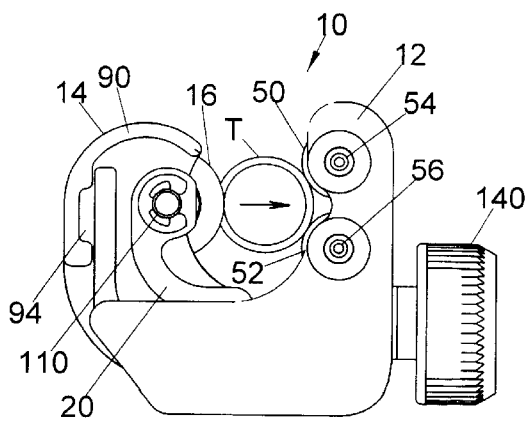
FIG. 5 is a view similar to FIG. 4 after the cut has been made.
Figure 6:
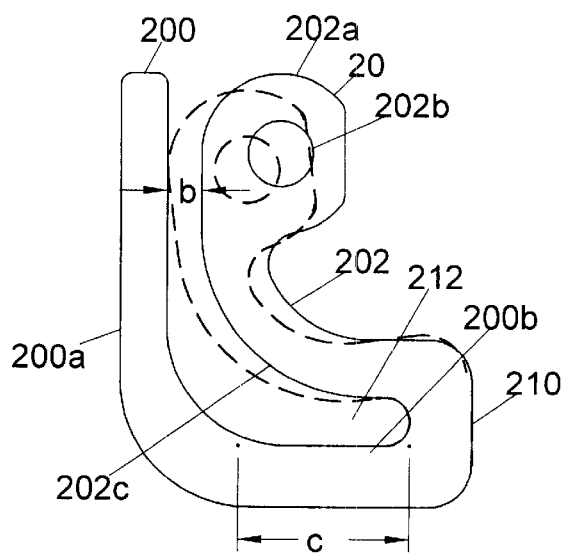
FIG. 6 is a side view of the novel spring used in the preferred embodiment of the invention, with a dashed line illustrating the maximum load position of the spring.

Referring now to the drawings wherein the showings are for the purpose of illustrating a preferred embodiment of the invention only and not for the purpose of limiting same, FIGS. 1–5 show tube cutter 10 having a first frame, or housing, 12 and a second frame, or cutter head, 14 on which is rotatably mounted cutter wheel 16 for cutting tube T, as best shown in FIGS. 4 and 5. During the cutting operation, cutter 10 is assembled onto the tube and rotated, either manually or by an electric driving handle. During rotation, a spring element in the form of two spaced, sheet metal springs 20, 22, as illustrated in FIG. 6, automatically feeds wheel 16 into the tube. In operation, the second frame is slidably moved with respect to the first frame until cutter wheel 16 engages tube T. Thereafter, further movement of the second frame deforms springs 20, 22 until the springs are fully collapsed. The spring provides the cutting force between the cutter wheel 16 and tube T as tool 10 is rotated about the tube.

Housing 12 is the first frame which is relatively fixed in the preferred embodiment and includes spaced walls 30, 32 joined at a base 36 containing transverse slide grooves 40 extending in the direction perpendicular to the axes of rollers 50, 52. These support rollers are rotatably mounted on shafts 54, 56 supported in spaced walls 30, 32. Grooves 40 are perpendicular to the plane of the axes of rollers 50, 52 positioned in recess 58 of housing 12. The rollers define cradle C for receiving tube T to be cut by tool 10. This cradle, in some low cost cutters, is defined by two angled support surfaces, even though rollers are preferred. For purposes to be explained later, between base 36 and rollers 50, 52 is a support bore 60 machined in boss 62 provided above base 36. The second frame or cutter head 14 includes a lower base 70 with outwardly extending runners or ways 72 slidably received in grooves 40 of the base 36. In this manner, cutter head 14 slides toward and away from housing 12 in the direction designated by arrow 70a in FIG. 3. Upstanding arm 80 has a bifurcated top defining a slot 82 to receive cutter wheel 16. Outwardly facing generally curved ribs 90, 92 terminate in lower vertically oriented spring abutments 94 that are generally perpendicular to a lower spring ledge or rest 96. Springs 20, 22 rest on ledge 96 with the rearward portion of the springs fixed against abutment 94. The upper bifurcated portions of arm 80 each include an elongated opening 100 for receiving shaft 110 that mounts cutter wheel 16 on arm 80. Shaft 110 extends through openings 100 and through the center of cutter wheel 16. It is held on the upstanding arm 80 by two snap rings 112 coacting with grooves 114 on the opposite ends of the shaft. Arm 80 includes the rotatable and movable structure for cutter wheel 16.

In accordance with the invention, cutter head 14 is slidable toward and away from the tube cradle C on housing 12 by spaced groove 40 in the housing and outboard runners or ways 72 on base 70 of the second frame or cutter head 14. To accomplish this positive sliding action, a threaded shaft 120 is captured in housing 12 by bore 60 using snap ring 146. Although the threaded shaft mechanism for sliding the two frames with respect to each other could take a variety of mechanical configurations, in the preferred embodiment, threaded shaft 120 is a bolt having an upset head 122 with a shaped crown 124 that fits in shaped hole 130 of knob 140. Flat surfaces on the crown and in the shaped hole allow the knob to rotate bolt 120. Smooth headed bolt 142 captures washer 144 when it is threadably mounted into threaded bore 145, best shown in FIG. 3. Thus, knob 140 is captured between washer 144 and head 122 of bolt 120. To hold the knob assembly against axial movement with respect to frame 12, bolt 120 is fixed rotatably in bore 60 by snap ring 146 on one side and low friction washer 148 on the opposite side. In this manner, knob 140 rotates bolt 120 freely in bore 60 in which the bolt is axially fixed. Cutter head 14 includes threaded bore 150 terminating in an outward clearance countersink 152. Rotation of knob 140 in one direction separates frames 12, 14. Rotation in the opposite direction brings frame or head 14 toward frame or housing 12. This linear movement is a smooth positive driving action controlled directly by the knob 140 to allow relative sliding of the two frames in the direction of arrow 70a shown in FIG. 3. To prevent separation of the frames, a removable pin 160 extends into linear slot 162 at base 70. The slot terminates at abutment 164. Consequently, pin 160 in base 36 and stop 164 in base 70 limit 20 the retracted position of the frames 12, 14.

Figure 7A:
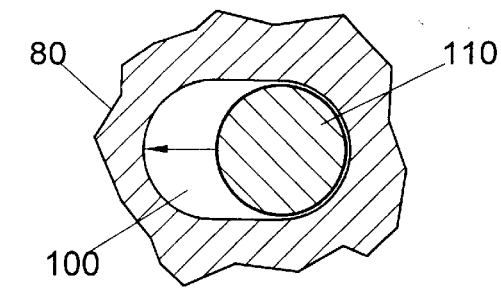
FIGS. 7A and 7B are partial schematic views illustrating the relationship between the wheel support shaft and the upstanding arm of the second frame when the spring is moved, as illustrated in FIG. 6.
Figure 7B:
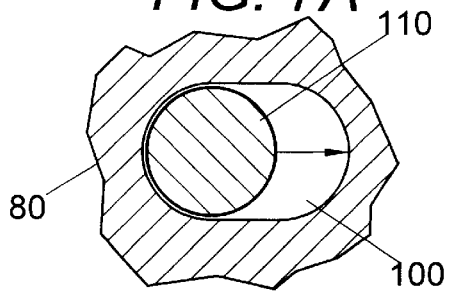

For cutting the tube, the tube T is received in cradle C with its central axis parallel to the axes of rollers 50, 52. Rotation of knob 140 moves cutter wheel 16 into engagement with the tube. Then, the knob is continued to be moved until the wheel 16 is forced back with springs 20, 22 collapsed against abutments 94 on opposite sides of upstanding arm 80. This loads the cutter wheel for the cutting action. Tool 10 is then rotated either manually or by a power drive mechanism to cut the tube with wheel 16. The initial position of the wheel is shown in FIG. 4 and the cut completed position is shown in FIG. 5. The difference in these positions is the location of shaft 110 in openings 100 as shown in FIGS. 7A, 7B. The loaded condition of FIG. 4 and the cut position of FIG. 5 have a space difference b, shown in FIG. 6. With the two springs fully collapsed, the force for cutting is at its maximum. Of course, a lesser force could be used for cutting the tube by only partially collapsing springs 20, 22.

Details of spring 20 are shown in FIG. 6. This same description applies to the opposite spring 22. Upstanding legs 200, 202 are terminal ends of a flat sheet metal spring. These legs are spaced apart a distance b at rest, and are touching when fully loaded. Leg 200 includes a vertical section 200a merging into a lower run 200b. Leg 202 has an upper head 202a with a shaft receiving hole 202b and a downwardly extending connecting section 202c. Vertical connector portion 210 forms a bight by joining legs 200,202. Run 200b and section 202c define horizontal slot 212 having a general length c. This length of slot 212 is selected to generate the desired force when leg 202 is forced against leg 200. The spring steel material of the spring, the length c of the slot, and the shape of the spring are selected to provide the desired force on cutter wheel 16 when the two upstanding spring legs are in the abutting relationship shown in FIG. 4. This position is also shown by the dashed line in FIG. 6. In practice, the applied force is selected to be in the general neighborhood of 80–150 pounds when combining the forces of both springs 20, 22. This is the cutting force exerted against tube T. Opening 100 in each of the bifurcated sections of arm 80 receive shaft 110. This shaft moves from the position shown in FIG. 7A to the position shown in FIG. 7B when the springs are shifted from the solid line position to the dashed line position, as shown in FIG. 6. In practice, the length of openings 100 is greater than the actual travel of shaft 110 during the loading and cutting action. These openings merely guide the cutter wheel and assure that it remains in the proper orientation during the cut action. The available stroke of cutter wheel 16 is distance b.

Figure 8:
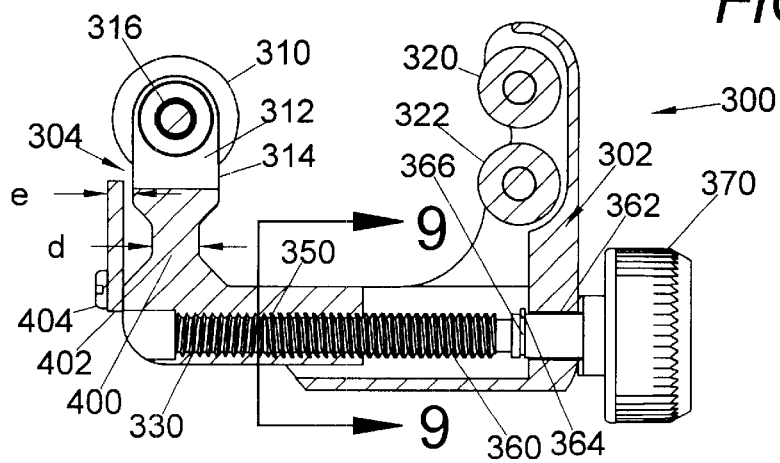
FIG. 8 is a side elevational view, partially cross sectioned, schematically illustrating a second embodiment of the present invention; and, FIG. 9 is an enlarged cross sectional view taken generally along the line 9—9 of FIG. 8.
Figure 9:
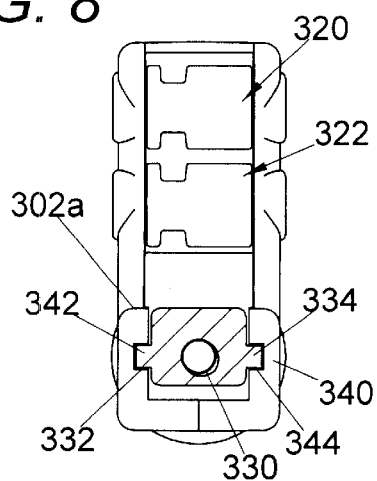

The invention involves positively sliding the second frame toward the first frame by a positive thread driving action or other positive drive mechanism. When the cutter wheel contacts the tube there is further linear sliding movement of the second frame toward the first frame. This is completely different from a concept wherein there is an intermedial spring action in the linear moving mechanism. In such prior arrangements, the actual cutting action involves further metal-to-metal sliding of the two frames. This action is not used in the present invention. Another embodiment for accomplishing this objective is schematically illustrated in FIGS. 8 and 9. Cutter 300 has a first frame 302 and a second frame 304 for rotatably supporting a cutter wheel 310 on a bifurcated end 312 of upstanding arm 314 through use of shaft 316 through bifurcated end 312. Frame 302 includes the normal support rollers 320, 322 extending in the direction parallel to the tube to be cut. Another linear motion mechanism based upon a threaded drive is illustrated. Lower base section 330 is an integral part of frame 304. It is slidably received in base 340 of frame 302. To prevent rotation of base section 330 with respect to frame 302, there is provided outwardly facing ribs 332, 334 slidably received in grooves 342, 344 in base 302a of housing or frame 302. Threaded bore 350 in section 330 receives a threaded shaft 360 rotatably supported by shank 362 and held axially with respect to base 302a by snap ring 364 in circumferentially extending grove 366. The outward end of shank 362 is knob 370. As so far described, cutting tool 300 operates in the same manner as cutting tool 10. To provide the spring action, section 400 of arm 314 has a reduced width d. This portion is flexible in a direction perpendicular to the axes of rollers 320, 322. Thus, knob 370 brings cutter wheel 310 into engagement with the tube to be cut. Section 400 is then flexed backwardly by continued rotation of knob 370. To limit the backward flexing of section 400, an optional stop plate 402 is bolted to section 330 by bolt 404. This provides a gap e to control the amount of deflection as wheel 310 is moved into the loaded cutting position. The use of a frame that flexes for the purposes of advancing a cutting tool is shown in Dubinsky U.S. Pat. No. 5,345,682. This patent is incorporated by reference for background information on the feature of a flexible frame to advance the cutter.

Various structures can be used for practicing the invention. The two embodiments are merely illustrative. They illustrate the invention as will be practiced, and an alternative embodiment of the invention.

Having thus defined the invention, the following is claimed:

1. A tube cutter for cutting a circular tube having a tube axis as said cutter is rotated around said tube axis, said cutter comprising: a housing with a cradle for supporting said tube with said tube axis extending in a given direction, a cutting head with a base and an upstanding cutter arm, said base and said housing having interacting longitudinal guide elements allowing linear sliding movement of said base on said housing in a direction perpendicular to said given direction and said tube axis, and a cutter wheel carried by said arm on a shaft for rotation about the axis of said shaft and generally parallel with said tube axis, said shaft being movable on said arm in said perpendicular direction, and a spring between said shaft and said arm to bias said cutter wheel toward said cradle and a threaded shaft drawing said cutter head base along said guide elements toward said cradle after a tube is supported in said cradle to deflect said spring and force said cutter wheel against said tube preparatory to rotation of said cutter around said tube, said arm having a terminal bifurcated end defining first and second upright elements on opposite sides of said cutter wheel, each of said elements having an opening for supporting said shaft, said openings being elongated in said perpendicular direction to allow movement of said shaft with respect to said upright elements by said spring, and said spring including two flat spring elements on opposite sides of said cutter wheel.

2. A cutter as defined in claim 1 wherein each of said flat spring elements includes first and second upstanding legs with one of said legs engaging said arm and the other of said legs having a hole for receiving said shaft.

3. A cutter as defined in claim 2 wherein said legs are joined in a transverse bight portion between upper and lower horizontal arms having two ends, with one end connected to said bight portion and the other end connected to one of said upstanding legs.

4. A tube cutter for cutting a circular tube having a tube axis as said cutter is rotated around said tube axis, said cutter comprising: a housing with a cradle for supporting said tube with said tube axis extending in a given direction, a cutting head with a base and an upstanding cutter arm, said base and said housing having interacting longitudinal guide elements allowing linear sliding movement of said base on said housing in a direction perpendicular to said given direction and said tube axis, a cutter wheel carried by said arm on a shaft for rotation about the axis of said shaft and generally parallel with said tube axis, said shaft being movable on said arm in said perpendicular direction, and a spring between said shaft and said arm to bias said cutter wheel toward said cradle and a threaded shaft drawing said cutter head base along said guide elements toward said cradle after a tube is supported in said cradle to deflect said spring and force said cutter wheel against said tube preparatory to rotation of said cutter around said tube.

5. A cutter as defined in claim 1 wherein said arm has a terminal bifurcated end defining first and second upright elements on opposite sides of said cutter wheel, each of said elements having and an opening for supporting said shaft.

6. A cutter as defined in claim 5 wherein said openings are elongated in said perpendicular direction to allow movement of said shaft with respect to said upright elements by said spring.

7. A cutter as defined in claim 1 wherein said guide elements comprise a pair of linear grooves and a pair of outwardly extending ribs.

8. A tube cutter for cutting a circular tube having a tube axis as said cutter is rotated around said tube axis, said cutter comprising: a housing with a cradle for supporting said tube with said tube axis extending in a given direction, a cutting head with a base and an upstanding cutter arm, said base and said housing having interacting longitudinal guide elements allowing linear sliding movement of said base on said housing in a direction perpendicular to said given direction and said tube axis, and a cutter wheel carried by said arm on a shaft for rotation about the axis of said shaft and generally parallel with said tube axis, said shaft being movable on said arm in said perpendicular direction, and a spring between said shaft and said arm to bias said cutter wheel toward said cradle and a threaded shaft drawing said cutter head base along said guide elements toward said cradle after a tube is supported in said cradle to deflect said spring and force said cutter wheel against said tube preparatory to rotation of said cutter around said tube, said spring including two flat spring elements on opposite sides of said cutter wheel.

9. A cutter as defined in claim 8 wherein each of said flat spring elements includes first and second upstanding legs with one of said legs engaging said arm and the other of said legs having a hole for receiving said shaft.

10. A cutter as defined in claim 9 wherein said legs are joined in a transverse bight portion between upper and lower horizontal arms having two ends, with one end connected to said bight portion and the other end connected to one of said upstanding legs.

11. A tube cutter for cutting a circular tube having a tube axis as said cutter is rotated around said tube axis, said cutter comprising: a housing with a cradle for supporting said tube with said tube axis extending in a given direction, a cutting head with a base and an upstanding cutter arm, said base and said housing having interacting longitudinal guide elements allowing linear sliding movement of said base on said housing in a direction perpendicular to said given direction and said tube axis, and a cutter wheel carried by said arm on a shaft for rotation about the axis of said shaft and generally parallel with said tube axis, said shaft being movable on said arm in said perpendicular direction, and a spring between said shaft and said arm to bias said cutter wheel toward said cradle and a threaded shaft drawing said cutter head base along said guide elements toward said cradle after a tube is supported in said cradle to deflect said spring and force said cutter wheel against said tube preparatory to rotation of said cutter around said tube, said arm having a terminal bifurcated end defining first and second upright elements on opposite sides of said cutter wheel, each of said elements having an opening for supporting said shaft, and said spring including two flat spring elements on opposite sides of said cutter wheel.

12. A cutter as defined in claim 11 wherein each of said flat spring elements includes first and second upstanding legs with one of said legs engaging said arm and the other of said legs having a hole for receiving said shaft.

13. A cutter as defined in claim 12 wherein said legs are joined in a transverse bight portion between upper and lower horizontal arms having two ends, with one end connected to said bight portion and the other end connected to one of said upstanding legs.

14. A tube cutter for cutting a circular tube having a tube axis as said cutter is rotated around said tube axis, said cutter comprising: a housing with a cradle for supporting said tube with said tube axis extending in a given direction, a cutting head with a base and an upstanding cutter arm, said base and said housing having interacting longitudinal guide elements allowing linear sliding movement of said base on said housing in a direction perpendicular to said given direction and said tube axis, and a cutter wheel carried by said arm on a shaft for rotation about the axis of said shaft and generally parallel with said tube axis, said shaft being movable on said arm in said perpendicular direction, and a spring between said shaft and said arm to bias said cutter wheel toward said cradle and a threaded shaft drawing said cutter head base along said guide elements toward said cradle after a tube is supported in said cradle to deflect said spring and force said cutter wheel against said tube preparatory to rotation of said cutter around said tube, said spring being flat and including first and second upstanding legs with one of said legs engaging said arm and the other of said legs having a hole for receiving said shaft.

15. A cutter as defined in claim 14 wherein said legs are joined in a transverse bight portion between upper and lower horizontal arms having two ends, with one end connected to said bight portion and the other end connected to one of said upstanding legs.

16. A tube cutter for cutting a circular tube having a tube axis as said cutter is rotated around said tube axis, said cutter comprising first and second frames for supporting and cutting said tube, at least one of said frames being slidably secured to the other of said frames for linear displacement toward and away from said other frame, a threaded shaft rotating in said other frame and secured to said one frame for axially displacing said one frame relative to said other frame into a fixed cutting position, a rotatable cutter wheel, and a spring mounting said cutter wheel on said one frame whereby linear movement of said one frame toward said other frame biases said cutter wheel to create a cutting force against a tube in said cutter when said one movable frame is in said fixed cutting position.

17. A cutter as defined in claim 16 wherein said one frame has a terminal bifurcated end defining first and second upright elements on opposite sides of said cutter wheel, each of said elements having an opening for a shaft supporting said cutter wheel.

18. A tube cutter for cutting a circular tube having a tube axis as said cutter is rotated around said tube axis, said cutter comprising first and second frames for supporting and cutting said tube, at least one of said frames being slidably secured to the other of said frames for linear displacement toward and away from said other frame, a threaded shaft rotating in said other frame and secured to said one frame for axially displacing said one frame relative to said other frame into a fixed cutting position, a rotatable cutter wheel, and a spring mounting said cutter wheel on said one frame whereby linear movement of said one frame toward said other frame biases said cutter wheel to create a cutting force against a tube in said cutter when said one movable frame is in said fixed cutting position, said spring including two flat spring elements on opposite sides of said cutter wheel.

19. A cutter as defined in claim 18 wherein each of said flat spring element includes first and second upstanding legs with one of said legs engaging said one movable frame and the other of said legs movable with said cutter wheel.

20. A cutter as defined in claim 19 wherein said legs are joined in a transverse bight portion between upper and lower horizontal arms having two ends, with one end connected to said bight portion and the other end connected to one of said upstanding legs.

21. A tube cutter for cutting a circular tube having a central tube axis, said cutter comprising: a housing with a cradle for receiving a tube to be cut with the tube axis in a given direction, a cutter head reciprocally mounted on said housing for sliding linearly in a direction toward and away from said cradle, said cutter head having a base and an upstanding arm supporting a cutter wheel rotatable about an axis generally parallel to said tube axis and facing said tube in said cradle, a spring element biasing said cutter wheel in said direction and relative to said cutter head, and a threaded shaft between said housing and said cutter head, and rotatable to move said cutter head linearly toward said housing whereby said cutter wheel engages said tube and said spring element creates a cutting force pushing said cutter wheel against said tube for cutting said tube.

22. A tube cutter as defined in claim 21 wherein said cutter wheel is carried by a shaft movable with respect to said arm and said spring element is a spring between said cutter wheel shaft and said arm.

23. A cutter as defined in claim 21 wherein said cutter wheel is rotatable about a cutter wheel shaft and said arm has a terminal bifurcated end defining first and second upright elements on opposite sides of said cutter wheel, each of said upright elements having an opening for supporting said cutter wheel shaft.

24. A cutter as defined in claim 23 wherein said openings are elongated in said direction to allow movement of said shaft with respect to said upright elements by said spring element.

25. A cutter as defined in claim 21 including two rollers with axes parallel to said tube axis for defining said cradle.

26. A tube cutter for cutting a circular tube having a central tube axis, said cutter comprising: a housing with a cradle for receiving a tube to be cut with the tube axis in a given direction, a cutter head reciprocally mounted on said housing for sliding linearly in a direction toward and away from said cradle, said cutter head having a base and an upstanding arm supporting a cutter wheel rotatable about an axis generally parallel to said tube axis and facing said tube in said cradle, a spring element biasing said cutter wheel in said direction and relative to said cutter head, and a threaded shaft between said housing and said cutter head and rotatable to move said cutter head linearly toward said housing whereby said cutter wheel engages said tube and said spring element creates a cutting force pushing said cutter wheel against said tube for cutting said tube, said cutter wheel being rotatably mounted on said upstanding arm and said spring element being a flexible section of said arm between said arm and said base of said cutter head.

27. A tube cutter for cutting a circular tube having a central tube axis, said cutter comprising: a housing with a cradle for receiving a tube to be cut with the tube axis in a given direction, a cutter head reciprocally mounted on said housing for sliding linearly in a direction toward and away from said cradle, said cutter head having a base and an upstanding arm supporting a cutter wheel rotatable about an axis generally parallel to said tube axis and facing said tube in said cradle, a spring element biasing said cutter wheel in said direction and relative to said cutter head, and a threaded shaft between said housing and said cutter head and rotatable to move said cutter head linearly toward said housing whereby said cutter wheel engages said tube and said spring element creates a cutting force pushing said cutter wheel against said tube for cutting said tube, said cutter wheel being carried by a shaft movable with respect to said arm and said spring element being a spring between said cutter wheel shaft and said arm, and said spring including two flat spring elements on opposite sides of said cutter wheel.

28. A cutter as defined in claim 27 wherein each of said flat spring elements includes first and second upstanding legs with one of said legs engaging said arm and the other of said legs having a hole for receiving said shaft.

29. A cutter as defined in claim 28 wherein said legs are joined in a transverse bight portion between upper and lower horizontal arms having two ends, with one end connected to said bight portion and the other end connected to one of said upstanding legs.

30. A tube cutter for cutting a circular tube having a tube axis as said cutter is rotated around said tube axis, said cutter comprising first and second frames for supporting and cutting said tube, at least one of said frames being slidably secured to the other of said frames for linear displacement toward and away from said other frame, a threaded shaft rotatable in said other frame and secured to said one frame for axially displacing said one frame relative to said other frame into a fixed cutting position, and a rotatable cutter wheel supported on said one frame for flexure relative thereto whereby linear movement of said one frame toward said other frame biases said cutter wheel to create a cutting force against a tube in said cutter when said one movable frame is in said fixed cutting position.

* * * * *

UNITED STATES PATENT AND TRADEMARK OFFICE
CERTIFICATE OF CORRECTION

PATENT NO. : 6,393,700 B1
DATED : May 28, 2002
INVENTOR(S) : Babb

It is certified that error appears in the above-identified patent and that said Letters Patent is hereby corrected as shown below:

<u>Title page,</u>
Item [57], ABSTRACT,
Line 3, after "tube" insert -- to be --.

<u>Column 3,</u>
Line 31, change "axis" to -- axes --.

<u>Column 6,</u>
Line 13, delete "20";
Line 53, change "receive" to -- receives --.

<u>Column 8,</u>
Line 23, after "cradle" insert -- , --, after "shaft" insert -- for --;
Line 28, change the numeral "1" to -- 4 --;
Line 36, change the numeral "1" to -- 4 --;
Line 52, after "cradle" insert -- , --, after "shaft" insert -- for --.

<u>Column 9,</u>
Lines 12 and 44, after "cradle" insert -- , --, and after "shaft" insert -- for --.

Signed and Sealed this

Seventeenth Day of December, 2002

JAMES E. ROGAN
*Director of the United States Patent and Trademark Office*